United States Patent
Mizotani et al.

(10) Patent No.: US 11,679,628 B2
(45) Date of Patent: Jun. 20, 2023

(54) TIRE

(71) Applicant: BRIDGESTONE CORPORATION, Tokyo (JP)

(72) Inventors: Kentaro Mizotani, Tokyo (JP); Tomohisa Okawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 199 days.

(21) Appl. No.: 16/770,072

(22) PCT Filed: Oct. 26, 2018

(86) PCT No.: PCT/JP2018/039985
§ 371 (c)(1),
(2) Date: Oct. 27, 2020

(87) PCT Pub. No.: WO2019/111584
PCT Pub. Date: Jun. 13, 2019

(65) Prior Publication Data
US 2021/0031564 A1 Feb. 4, 2021

(30) Foreign Application Priority Data

Dec. 8, 2017 (JP) .............................. JP2017-236139

(51) Int. Cl.
*B60C 9/18* (2006.01)
*B60C 9/22* (2006.01)
*B60C 15/04* (2006.01)

(52) U.S. Cl.
CPC ............ *B60C 9/2204* (2013.01); *B60C 15/04* (2013.01); *B60C 2009/2238* (2013.01)

(58) Field of Classification Search
CPC ... B60C 15/04; B60C 15/05; B60C 2015/042; B60C 2015/044; B60C 2015/046; B60C 2015/048; B60C 9/0057; B60C 9/22; B60C 9/2204; B60C 2009/2209
See application file for complete search history.

(56) References Cited

U.S. PATENT DOCUMENTS

| | | |
|---|---|---|
| 2005/0191472 A1 | 9/2005 | Oonishi et al. |
| 2010/0032072 A1 | 2/2010 | Isobe |
| 2012/0291933 A1 | 11/2012 | Tanno et al. |

(Continued)

FOREIGN PATENT DOCUMENTS

| | | |
|---|---|---|
| CN | 1660559 A | 8/2005 |
| CN | 105121180 A | 12/2015 |

(Continued)

OTHER PUBLICATIONS

Machine Translation: JP-2001322403-A, Ota Y, (Year: 2022).*

(Continued)

*Primary Examiner* — Kendra Ly
(74) *Attorney, Agent, or Firm* — Solaris Intellectual Property Group, PLLC

(57) ABSTRACT

A tire includes an annular tire structural member in which a resin-covered cord, configured by covering a reinforcing cord with a resin including a protrusion formed on a side face, is wound in a spiral shape with the resin at one portion of the resin-covered cord integrally bonded to the resin at another mutually adjacent portion of the resin-covered cord.

1 Claim, 9 Drawing Sheets

(56) References Cited

U.S. PATENT DOCUMENTS

| | | |
|---|---|---|
| 2013/0230697 A1 | 9/2013 | Sugimoto |
| 2016/0068021 A1 | 3/2016 | Kon et al. |
| 2016/0271868 A1 | 9/2016 | Ono |
| 2017/0210183 A1 | 7/2017 | Kon et al. |
| 2017/0259515 A1* | 9/2017 | Kon ............... B60C 9/0007 |
| 2017/0305197 A1 | 10/2017 | Kon et al. |
| 2020/0062038 A1* | 2/2020 | Hasegawa ........ B29D 30/0005 |

FOREIGN PATENT DOCUMENTS

| | | | |
|---|---|---|---|
| CN | 106573494 A | | 4/2017 |
| CN | 107000479 A | | 8/2017 |
| EP | 159169 A2 | | 10/1985 |
| JP | 304-78603 A | | 3/1992 |
| JP | H04-270614 A | | 9/1992 |
| JP | 2000-290476 A | | 10/2000 |
| JP | 2001322403 A | * | 11/2001 |
| JP | 2002-240160 A | | 8/2002 |
| JP | 2011131866 A | * | 7/2011 |
| JP | 2012-228995 A | | 11/2012 |
| JP | 2014-184932 A | | 10/2014 |
| JP | 2014-210487 A | | 11/2014 |
| JP | 2015-164849 A | | 9/2015 |
| JP | 2016-97945 A | | 5/2016 |
| WO | 2008/065832 A1 | | 6/2008 |
| WO | 2012/077372 A1 | | 6/2012 |
| WO | WO-2016084535 A1 * | 6/2016 | ............ B29D 30/06 |

OTHER PUBLICATIONS

Machine Translation: JP-2011131866-A, Miyazono T, (Year: 2022).*
Search Report of the Chinese office action dated Sep. 16, 2021, from the SIPO in a Chinese patent application No. 2018800793796 corresponding to the instant patent application.
International Search Report issued in International Application No. PCT/JP2018/039985 dated Jan. 29, 2019.
Search Report of the Chinese office action dated Feb. 21, 2022, from the SIPO in a Chinese patent application No. 2018800793796 corresponding to the instant patent application.

* cited by examiner

FIG.2
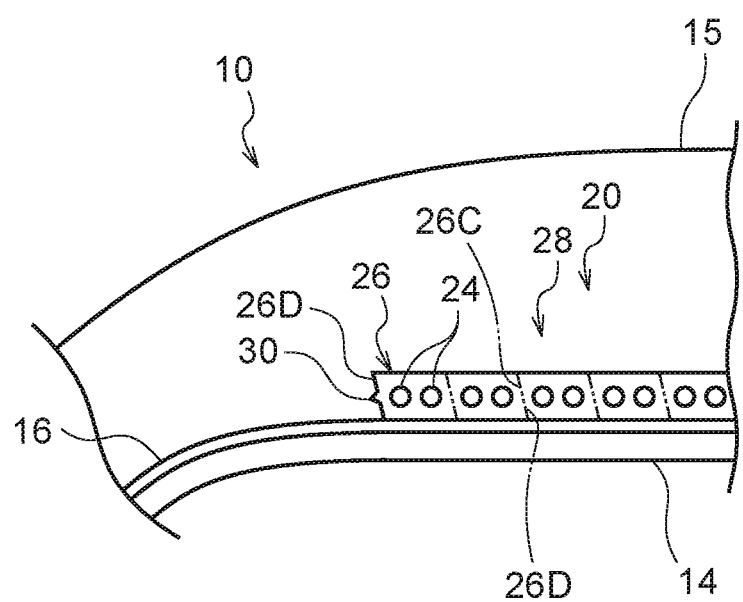
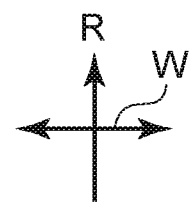

FIG.9
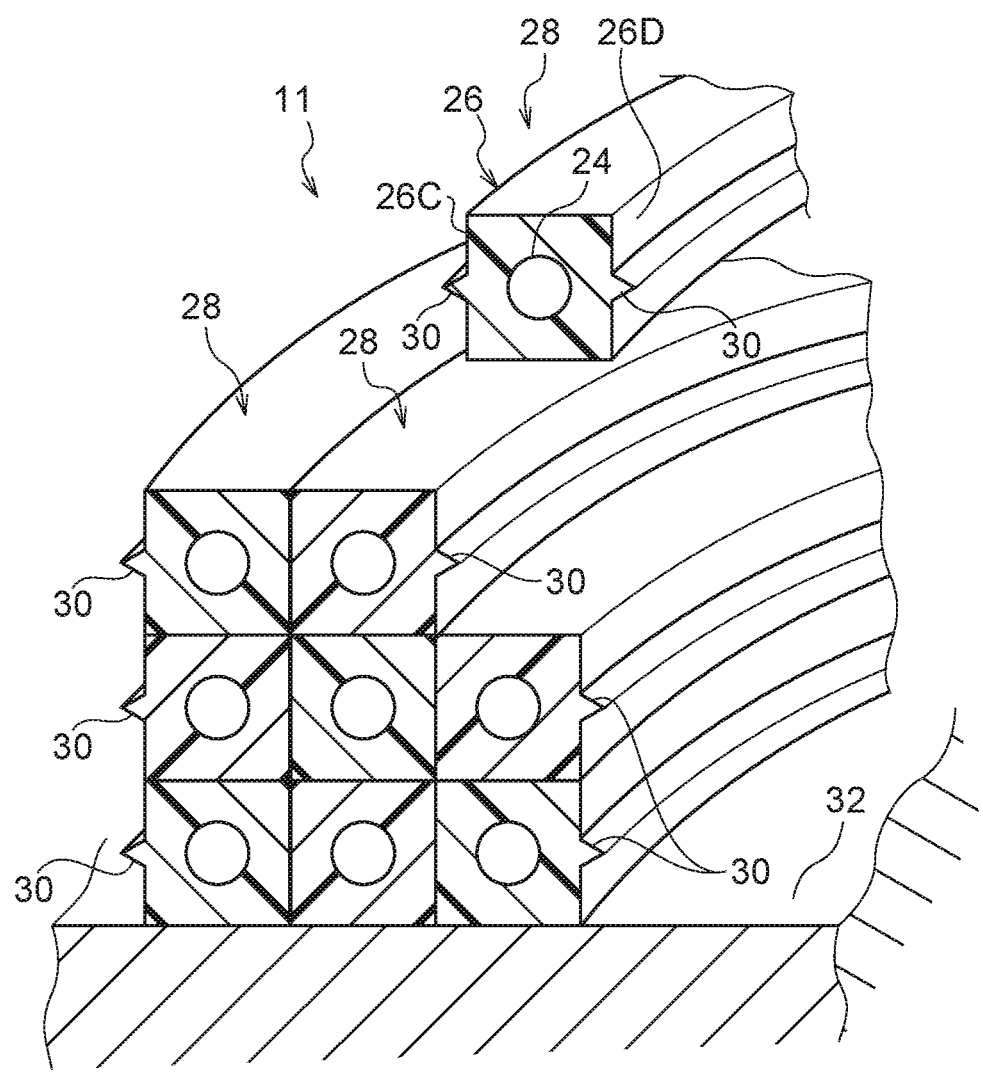
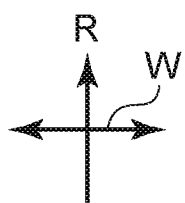

TIRE

TECHNICAL FIELD

The present disclosure relates to a tire.

BACKGROUND ART

Japanese Patent Application Laid-Open (JP-A) No. 2014-210487 discloses a tire including a resin-covered cord configured by covering a reinforcing cord with a resin covering. The resin-covered cord is wound in a spiral shape and bonded to the outer circumference of a tire frame member configured using a resin material so as to configure a belt layer.

SUMMARY OF INVENTION

Technical Problem

In the conventional example described above, when bonding the resin-covered cord to the outer circumference (a wind-on face) of the tire frame member, hot air is blown against a fixing-side face of the resin-covered cord and against the outer circumference of the tire frame member, thus melting the locations onto which the hot air is blown. The resin-covered cord is then pressed against the outer circumference of the tire frame member using a press roller so as to weld the resin-covered cord to the outer circumference of the tire frame member.

However, as the resin-covered cord is wound in a spiral shape at a constant pitch, if portions where the width of the resin-covered cord is reduced as a result of manufacturing variation in the resin-covered cord are disposed adjacent to each other, gaps may form within the resin of the resin-covered cord. Moreover, for example in cases in which the wind-on face has a circular arc shaped cross-section as sectioned in the axial direction of the winding target, steps in the resin may be formed at mutually adjacent portions of the resin-covered cord due to the radial difference, which could facilitate the formation of gaps. If such gaps form within the resin, there is a concern that the resin may not weld together adequately.

Annular tire structural members such as belts are sometimes manufactured by winding a resin-covered cord in a spiral shape onto a wind-on face configured from a material such as a metal to which resin does not readily adhere, and then welding together the resin of mutually adjacent portions of the resin-covered cord and removing the resulting product from the wind-on face. In such cases, since the resin of the resin-covered cord is not welded to the wind-on face, were the resin of the mutually adjacent portions of the resin-covered cord to be inadequately welded, it may be difficult to secure durability in a tire in which this tire structural member is then employed.

An object of the present disclosure is to improve the durability of a tire including a tire structural member configured by winding a resin-covered cord in a spiral shape.

Solution to Problem

A tire according to a first aspect includes an annular tire structural member in which a resin-covered cord, configured by covering a reinforcing cord with a resin including a protrusion formed on a side face, is wound in a spiral shape with the resin at one portion of the resin-covered cord integrally bonded to the resin at another mutually adjacent portion of the resin-covered cord. The protrusion is formed on a side face of the resin.

The protrusion formed on the side face of the resin melts rapidly when melting and bonding together the resin of the one portion of the resin-covered cord and the resin of the other mutually adjacent portion of the resin-covered cord. The molten resin flows between the mutually adjacent resin, thereby suppressing gap formation. This thereby stabilizes the bond between the mutually adjacent portions of the resin-covered cord, even in cases in which manufacturing variation is present in the resin-covered cord.

A second aspect is the tire according to the first aspect, wherein the tire structural member is a belt disposed at an outer circumference of a tire frame member.

In this tire, since the tire structural member is a belt, the durability of a tire outer circumference portion is improved.

A third aspect is the tire according to either the first aspect or the second aspect, wherein the tire structural member is a bead core embedded in a bead portion.

In this tire, since the tire structural member is a bead core, the durability of the bead portion is improved.

Advantageous Effects of Invention

The tire according to the present disclosure is capable of improving the durability of a tire including a tire structural member configured by winding a resin-covered cord in a spiral shape.

BRIEF DESCRIPTION OF DRAWINGS

FIG. 2 is an enlarged cross-section illustrating a structure of a belt portion of a tire according to an exemplary embodiment.

FIG. 9 is a perspective view cross-section illustrating a process to manufacture a bead core by winding a resin-covered cord onto the outer circumference of a core.

DESCRIPTION OF EMBODIMENTS

Figure 1:
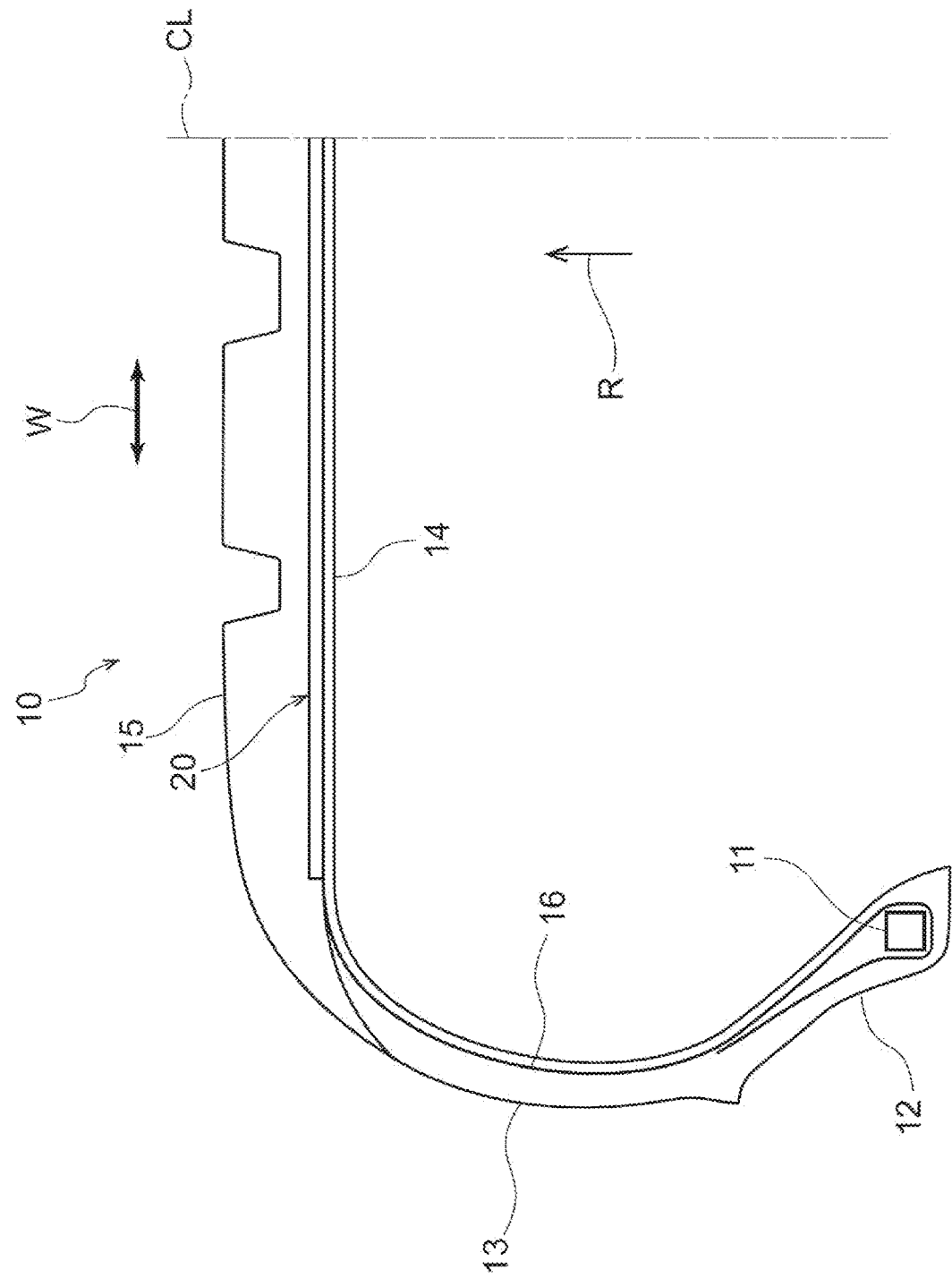
FIG. 1 is a cross-section illustrating one side of a tire equatorial plane of a tire according to an exemplary embodiment.

Explanation follows regarding an exemplary embodiment of the present invention, with reference the drawings. In the drawings, the arrow R indicates a tire radial direction, and the arrow W indicates a tire width direction. The tire radial direction refers to a direction orthogonal to a tire rotation axis (not illustrated in the drawings). The tire width direction refers to a direction parallel to the tire rotation axis. The terms "tire width direction" and "tire axial direction" may be used interchangeably. In the drawings, CL indicates a tire equatorial plane.

The methods used to measure dimensions of the various portions correspond to the methods set out in the 2017 edition of the Japan Automobile Tyre Manufacturers Association (JATMA) Year Book. Where TRA standards or ETRTO standards are applicable in the region of use or region of manufacture, such standards shall be adopted.

Tire

As illustrated in FIG. 1, a tire 10 according to the present exemplary embodiment includes, for example, a pair of bead portions 12, within each of which is embedded an annular bead core 11, side portions 13 running continuously from the bead portions 12 toward the tire radial direction outer side, and a crown portion 14 coupling the side portions 13 on either side together in the tire width direction.

The bead cores 11 are configured by bead cords (not illustrated in the drawings). The bead cords are configured by metal cords such as steel cords, organic fiber cords, resin-covered organic fiber cords, a hard resin, or the like. Note that the bead cores 11 may be omitted as long as adequate rigidity can be secured for the bead portions 12.

The side portions 13 form side portions of the tire 10, and are each gently curved so as to protrude toward the tire axial direction outer side on progression from the corresponding bead portion 12 toward the crown portion 14. The crown portion 14 is a portion that supports a tread 15 disposed at the tire radial direction outer side of the crown portion 14.

A carcass ply 16 is wrapped around the respective bead cores 11 and straddles between the pair of bead portions 12. The carcass ply 16 is an example of a tire frame member, and is for example configured by covering cords (not illustrated in the drawings) arranged around the tire circumferential direction with rubber. Note that the tire frame member is not limited to the carcass ply 16, and may be configured from a resin material. Reinforcing materials (polymer or metal fibers, cords, nonwoven fabric, woven fabric, or the like) may be embedded in such a resin tire frame member as appropriate.

Belt

Figure 5:
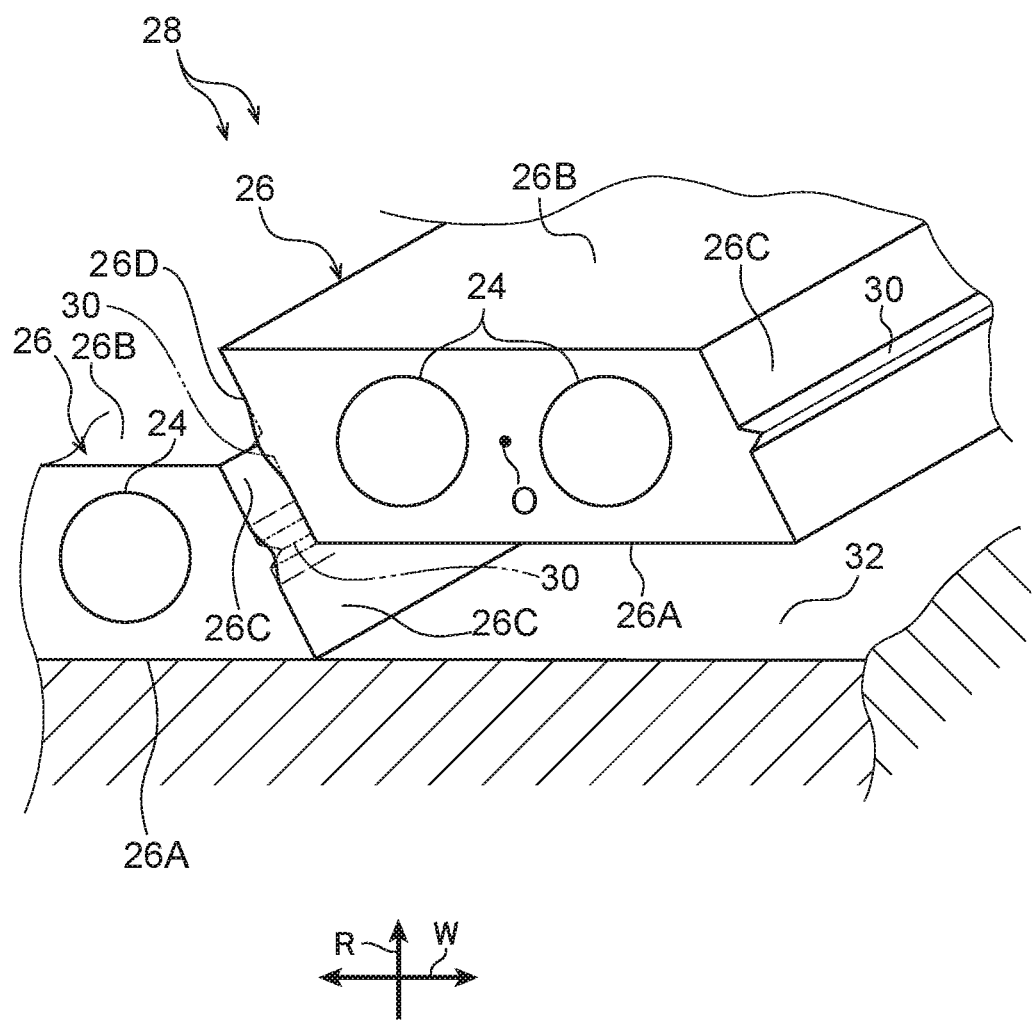
FIG. 5 is a cross-section illustrating a resin-covered cord that has been pressed against the outer circumference of a core and a resin-covered cord about to be pressed against the outer circumference of the core.
Figure 6:
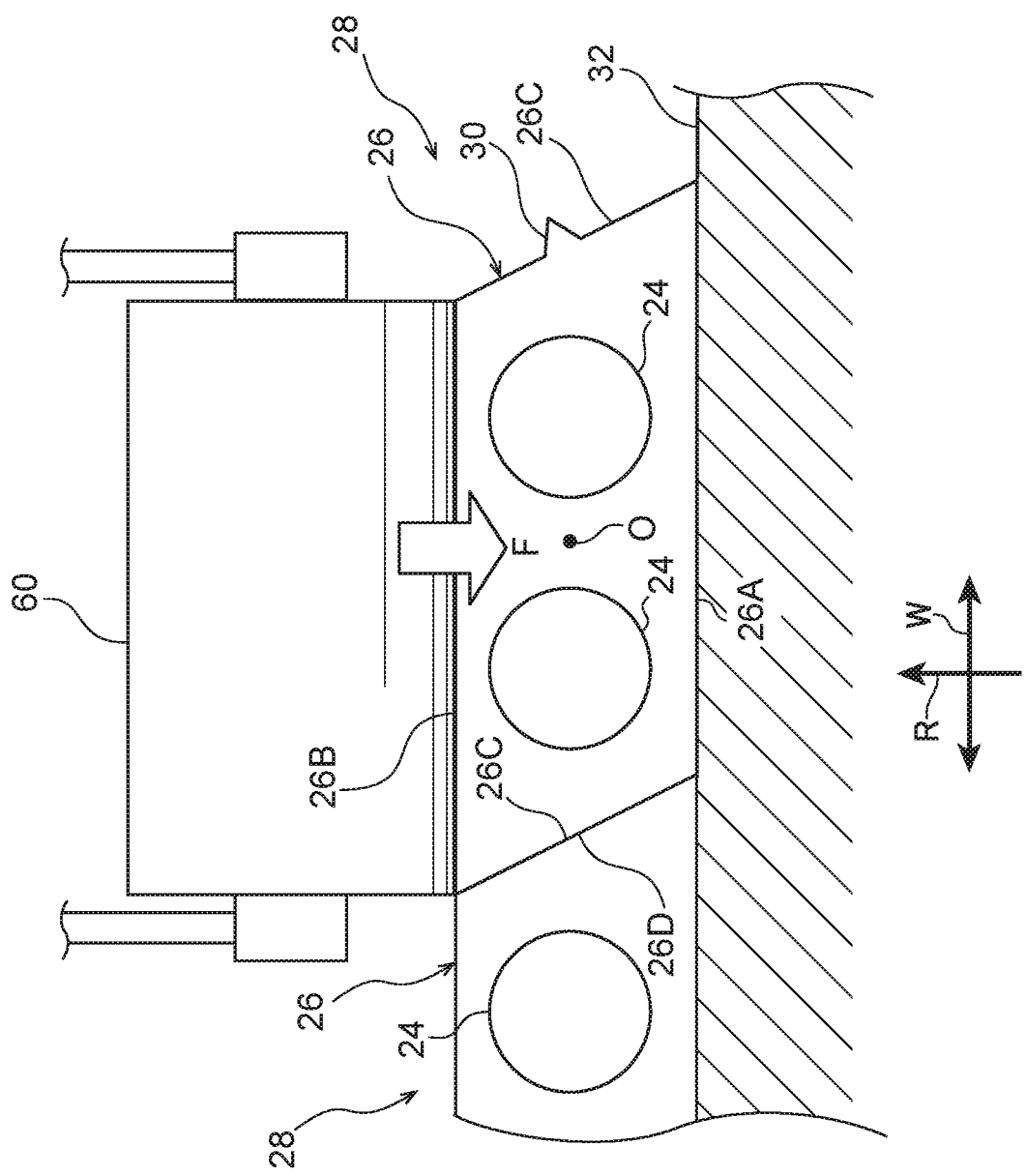
FIG. 6 is a cross-section illustrating a resin-covered cord in a state pressed against the outer circumference of a core by a pressing roller.

As illustrated in FIG. 1 and FIG. 2, the tire 10 includes an annular belt 20, serving as a tire structural member. The belt 20 is disposed at the outer circumference of the carcass ply 16. As illustrated in FIG. 3 to FIG. 6, the belt 20 is configured by winding a resin-covered cord 28, configured by covering reinforcing cords 24 with a thermoplastic resin 26, in a spiral shape with the resin 26 of one portion of the resin-covered cord 28 integrally bonded to the resin 26 of another mutually adjacent portion of the resin-covered cord 28 in the tire axial direction. More specifically, as illustrated in FIG. 5 and FIG. 6, a side face 26C of the resin 26 of the one portion of the resin-covered cord 28 and a side face 26D of the resin 26 of the other portion of the resin-covered cord 28 that is mutually adjacent in the tire axial direction are integrally bonded by thermal welding. The side faces 26C, 26D oppose each other when the resin-covered cord 28 is wound in a spiral shape.

The side face 26C of the resin 26 is inclined with respect to the tire radial direction so as to face toward the tire radial direction outer side. The side face 26D is also inclined with respect to the tire radial direction, so as to face toward the tire radial direction inner side. The side faces 26C, 26D are disposed so as to run substantially parallel to each other. Namely, as sectioned in the tire axial direction, the resin 26 has a substantially parallelogram shaped cross-section profile. Note that the side faces 26C, 26D may be inclined at different angles with respect to the tire radial direction such that they are not parallel with each other.

A protrusion 30 is, for example, formed atone location on each of the side faces 26C, 26D of the resin 26 of the resin-covered cord 28. Each of the protrusions 30 is formed along the length direction of the resin-covered cord 28, for example continuously. The protrusions 30 are positioned substantially at the tire radial direction centers of the side faces 26C, 26D. The volume of the protrusions 30 as a proportion of the overall volume of the resin 26 is very small. Moreover, for example, each of the protrusions 30 has a tapered, substantially triangular cross-section profile. Since the protrusions 30 are of comparatively small volume and have tapered cross-section profiles, the protrusions 30 are the first locations to melt when thermally welding the resin-covered cord 28 together, thus enabling melting of the side faces 26C, 26D to be promoted (FIG. 5).

Note that the protrusions 30 are not limited to having substantially triangular shaped cross-section profiles, and may have other shapes, such as trapezoidal shapes or semi-circular shapes. The cross-section profiles of the protrusions 30 are not limited as long as they speed melting of the resin 26 and are capable of filling any gaps between the resin-covered cord 28.

Although the shapes of the protrusions 30 at the bond locations are lost after the resin 26 has been bonded together, as illustrated in FIG. 2, the protrusions 30 remain on the resin 26 of the resin-covered cord 28 positioned at the tire axial direction end portions of the belt 20 where thermal welding is not employed.

A tire radial direction inner side face 26A of the resin 26 of the resin-covered cord 28 is bonded to the outer circumference of the carcass ply 16. The tread 15 is bonded to a tire radial direction outer side face 26B of the resin 26 through cushioning rubber (not illustrated in the drawings). The inner side face 26A and the outer side face 26B are formed so as to run parallel to each other.

Modified Examples of the Resin-Covered Cord

Figure 7:
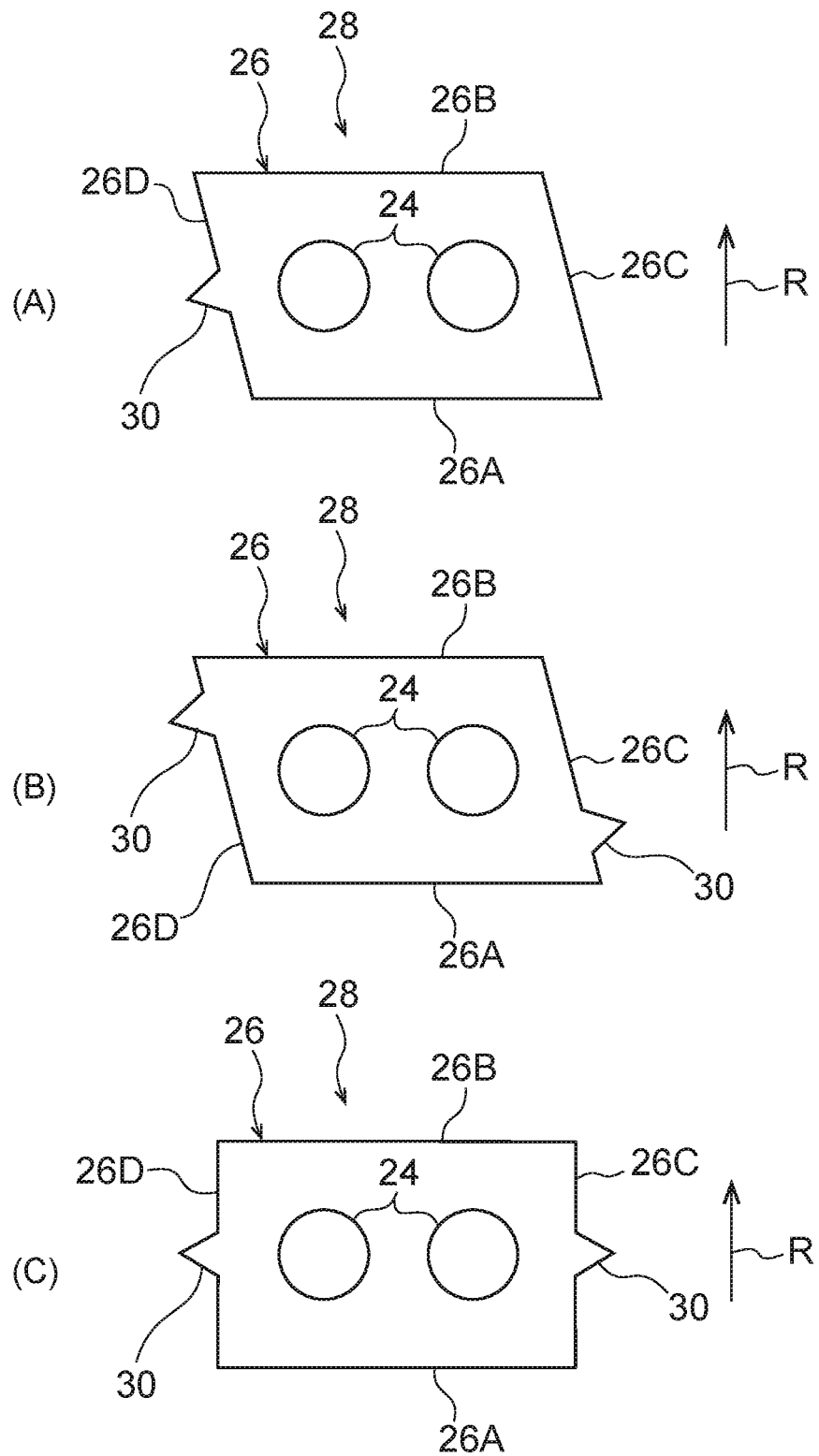
FIG. 7(A) to FIG. 7(C) are cross-sections illustrating modified examples of a resin-covered cord.

The positions where the protrusions 30 are provided to the resin 26 of the resin-covered cord 28 are not limited to positions on both the side faces 26C, 26D, and as illustrated in FIG. 7(A), a protrusion 30 may for example be provided to the side face 26D only. Moreover, the positions where the protrusions 30 are provided are not limited to substantially the tire radial direction centers of the side faces 26C, 26D, and as illustrated in FIG. 7(B), the protrusions 30 may be provided at different positions on the respective side faces 26C, 26D.

The cross-section profile of the resin 26 as sectioned in the tire axial direction is not limited to a substantially parallelogram shape, and the shapes illustrated in FIG. 7(C) or FIG. 8(A) to FIG. 8(D) may be adopted. In the example illustrated in FIG. 7(C), the resin 26 has a substantially rectangular cross-section profile.

Figure 8:
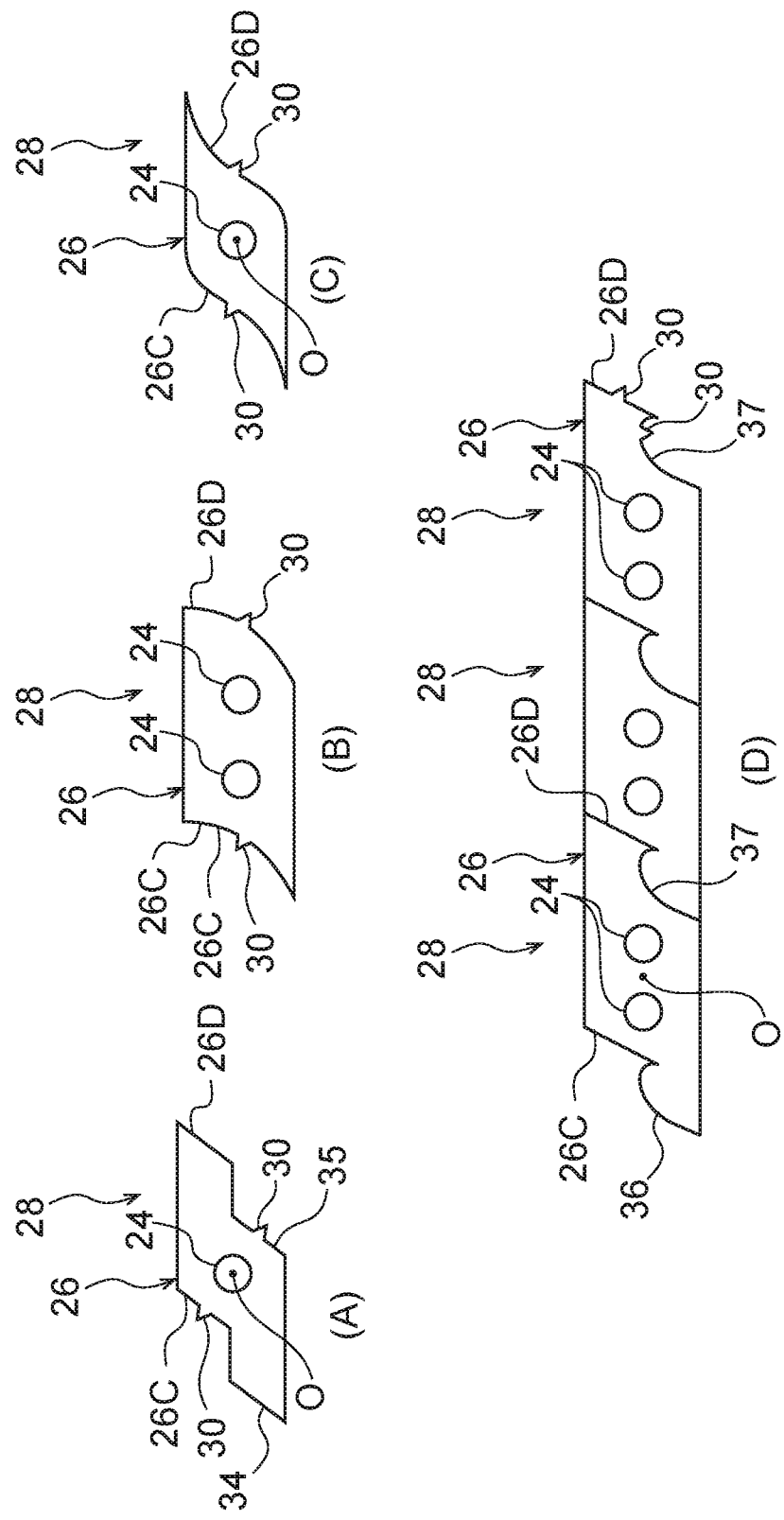
FIG. 8(A) to FIG. 8(D) are cross-sections illustrating modified examples of a resin-covered cord.

In the example illustrated in FIG. 8(A), the side faces 26C, 26D of the resin 26 are formed with mutually interlocking stepped profiles. Specifically, the side face 26C is provided with a projection 34, and the side face 26D is provided with a recess 35 capable of fitting together with the projection 34. The projection 34 and the recess 35 are, for example, each formed with a substantially parallelogram shape. The side face 26C and the projection 34, and the side face 26D and the recess 35, are accordingly disposed with point symmetry to one another about the center O of the resin-covered cord 28. The protrusions 30 are, for example, provided to both the side face 26C and the recess 35.

In the example illustrated in FIG. 8(B), the side faces 26C, 26D of the resin 26 are not disposed with point symmetry to each other, but are formed with mutually interlocking arc shaped profiles. As an example, the side face 26C is formed with a concave profile while the side face 26D is formed with a convex profile. Note that the side face 26C may have a convex profile and the side face 26D a concave profile. The protrusions 30 are for example provided to both the side faces 26C, 26D.

In the example illustrated in FIG. 8(C), the side faces 26C, 26D of the resin 26 are formed with mutually interlocking curved profiles with inflection points, and that are disposed with point symmetry to each other about the center O of the resin-covered cord 28. The protrusions 30 are for example provided at positions corresponding to the inflection points of the side faces 26C, 26D.

In the example illustrated in FIG. 8(D), the side faces 26C, 26D of the resin 26 are formed with profiles that are not disposed with point symmetry to each other, but that engage with one another when applied with tension in the tire axial direction. Specifically, an engagement protrusion 36 is provided to the side face 26C, and an engagement recess 37 having a profile capable of engaging with the engagement protrusion 36 in the tire axial direction is provided to the side face 26D. In other words, the side faces 26C, 26D have anchoring profiles. The protrusions 30 are for example respectively provided to the side face 26D and the engagement recess 37.

Note that the number of the reinforcing cords 24 covered by the resin 26 is not limited to two, and three or more of the reinforcing cords 24 may be covered by the resin 26. Alternatively, a single reinforcing cord 24 may be covered by the resin 26 (as in FIG. 8(A) and FIG. 8(C)).

Operation

Explanation follows regarding operation of the present exemplary embodiment configured as described above. As illustrated in FIG. 5, in the tire 10 according to the present exemplary embodiment, the resin-covered cord 28 is wound in a spiral shape, and the protrusions 30 formed to the side faces 26C, 26D of the resin 26 melt rapidly when melting and bonding together the resin 26 of one portion of the resin-covered cord 28 and the resin 26 of another mutually adjacent portion of the resin-covered cord 28. Some of the molten resin 26 flows between the mutually adjacent resin 26, thereby suppressing gap formation. Accordingly, gap formation can be suppressed even in cases in which the winding pitch increases due to manufacturing variation of the resin-covered cord 28, thereby enabling the mutually adjacent portions of the resin-covered cord 28 to be bonded together stably. Namely, the robustness of the winding pitch is improved.

In cases in which the resin-covered cord 28 has a parallelogram shaped cross-section, the adhesion surface area of the side faces 26C, 26D is larger than in the case of a rectangular cross-section, thus improving adhesion.

In cases in which the resin-covered cord 28 is wound onto a face that is curved in tire axial direction cross-section, V-shaped spaces open up between the mutually adjacent side faces 26C, 26D on progression toward the radial direction outer side. However, even in such cases, melting of the protrusions 30 enables gap formation to be suppressed.

Laying the belt 20 that is configured by winding the resin-covered cord 28 in a spiral shape on the outer circumference of the carcass ply 16 enables the durability of a tire outer circumference portion to be improved.

Bead Core

The tire structural member configured by winding the resin-covered cord 28 in a spiral shape is not limited to the belt 20, and may be configured by to the bead cores 11 embedded in the bead portions 12. In the example illustrated in FIG. 9, the bead cores 11 employ a resin-covered cord 28 in which, for example, a single reinforcing cord 24 is covered by resin 26 with a substantially square cross-section profile. The resin-covered cord 28 is, for example, wound around the outer circumference of an annular metal core 32 such that the resin-covered cord 28 forms three tiers of three full circuits each. The resin 26 is welded together, and the core 32 is then removed to configure the annular bead core 11. The resin 26 is bonded together at portions that are mutually adjacent to each other in the tire axial direction, and also at portions that are mutually adjacent to each other in the tire radial direction.

In this example too, although the shapes of the protrusions 30 at the bond locations are lost after the resin 26 has been bonded together, the protrusions 30 remain on the resin 26 of the resin-covered cord 28 positioned at the tire axial direction end portions of the bead cores 11 where thermal welding is not employed. The bead cores 11 may then be employed embedded within the bead portions 12 (FIG. 1) of the tire 10. Employing such bead cores 11 improves the durability of the bead portions 12.

Belt Manufacturing Method

Next, explanation follows regarding a manufacturing method of the annular belt 20, considering a case in which the tire frame member is configured by the carcass ply 16. In such cases, a circular cylinder shaped core 32 is employed as a wind-on face for the resin-covered cord 28. The outer circumference (wind-on face) of the core 32 is, for example, configured from metal. The outer circumference of the core 32 may have a linear cross-section profile, or may have a curved cross-section profile. Moreover, the outer circumference of the core 32 may be configured by a combination of a portion having a linear cross-section profile and a portion having a curved cross-section profile.

Figure 3:
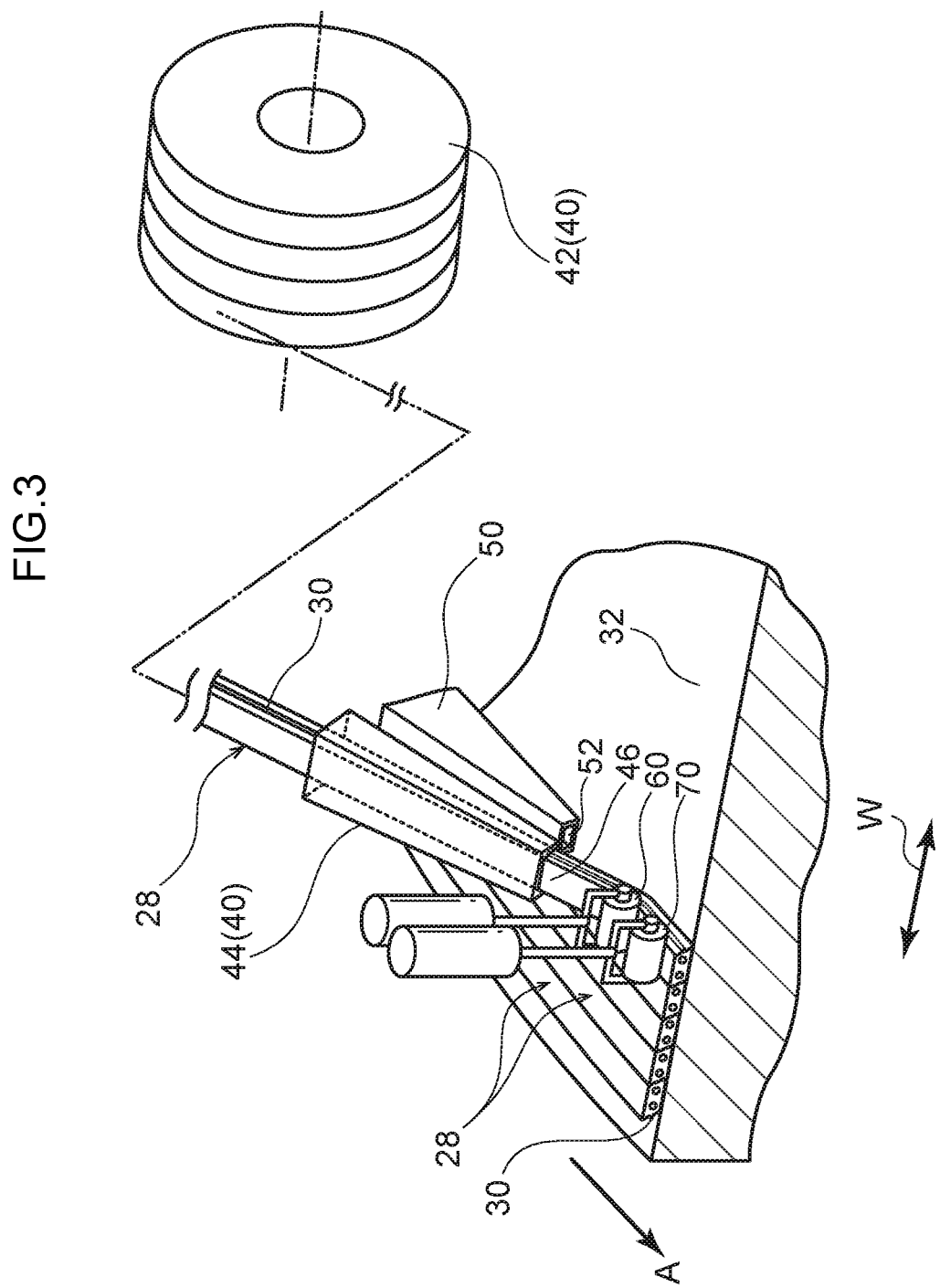
FIG. 3 is a perspective view cross-section illustrating a process to manufacture a belt by winding a resin-covered cord onto the outer circumference of a core.

First, explanation follows regarding a process to wind the resin-covered cord 28 onto the outer circumference of the core 32. First, the core 32 is attached to a support device (not illustrated in the drawings) that rotatably supports the core 32, and as illustrated in FIG. 3, a cord feeder 40, a heater 50, a press roller 60 serving as a pressing unit, and a cooling roller 70 serving as a cooling unit are moved to the vicinity of the outer circumference of the core 32.

The cord feeder 40 is configured including a reel 42 on which the resin-covered cord 28 is taken up, and a guide member 44. The guide member 44 is a member to guide the resin-covered cord 28 fed out from the reel 42 onto the outer circumference of the core 32. The guide member 44 is configured in a tube shape, and the resin-covered cord 28 passes through the interior of the guide member 44. Moreover, the resin-covered cord 28 is fed out toward the outer circumference of the core 32 through an opening 46 of the guide member 44.

Figure 4:
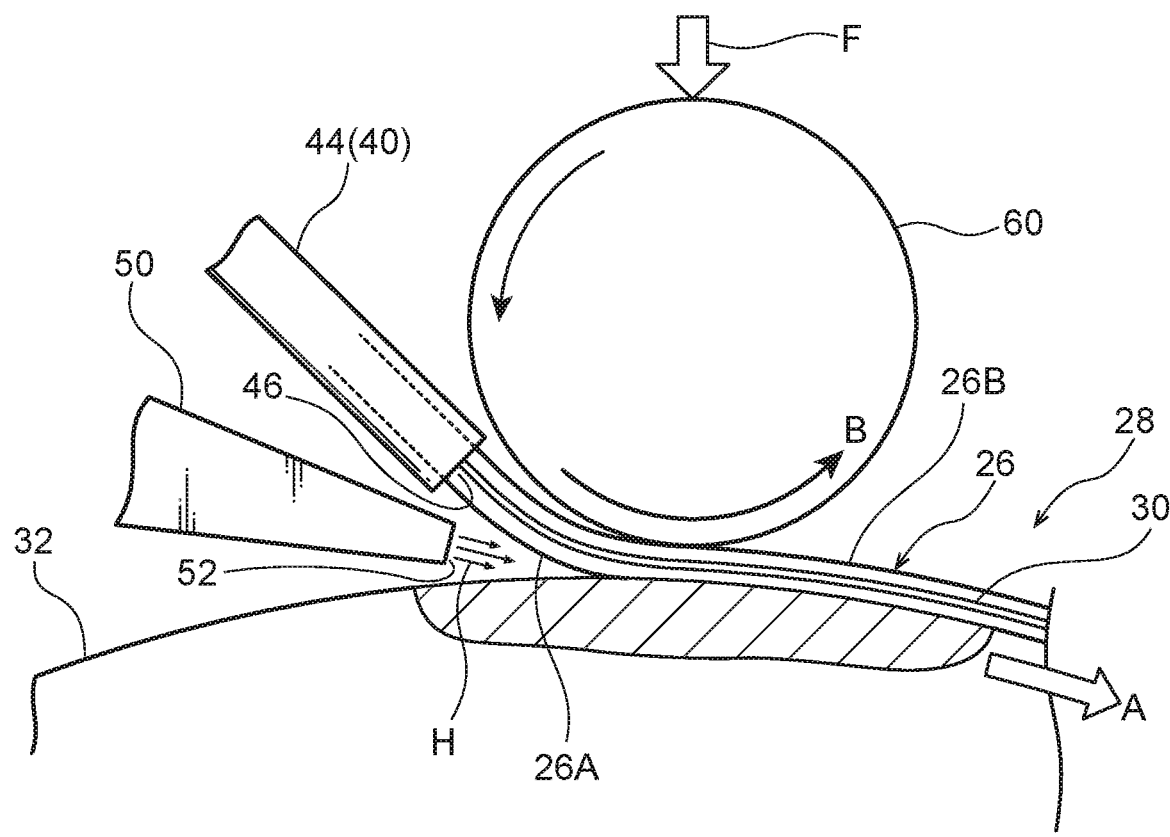
FIG. 4 is a side view illustrating a state in which a press roller is pressing a resin-covered cord against the outer circumference of a core.

As illustrated in FIG. 4, the heater 50 blows hot air H onto the thermoplastic resin so as to heat and melt the location that is blown. The location onto which the hot air H is blown corresponds to the inner side face 26A of the resin 26 of the resin-covered cord 28 that is being pressed against the outer circumference of the core 32. As the resin-covered cord 28 is wound around at least one complete circuit of the outer circumference of the core 32, the hot air H is also blown onto the side faces 26C, 26D (FIG. 5) of the resin 26 in cases in which resin-covered cord 28 that has already been pressed against the outer circumference is present.

The heater 50 employs a fan (not illustrated in the drawings) to create a flow of air heated by an electric heating element (not illustrated in the drawings) to be blown out through a blower outlet 52. Note that the configuration of the heater 50 is not limited to that described above, and any configuration may be adopted as long as it is capable of heating and melting the thermoplastic resin. For example, a soldering iron may contact a location to be melted in order to heat and melt this contacted location. Alternatively, a location to be melted may be heated and melted using thermal radiation, or may be heated and melted by irradiating with infrared rays.

As illustrated in FIG. 4, the press roller 60 presses the resin-covered cord 28 against the outer circumference of the core 32 with an adjustable pressing force F. Moreover, a roller surface of the press roller 60 is treated to prevent adhesion of molten resin material thereto. The press roller 60 is capable of rotating, and in a state in which the resin-covered cord 28 is being pressed against the outer circumference of the core 32, the press roller 60 rotates (in the direction of arrow B) so as to follow the direction of rotation of the core 32 (the direction of arrow A).

As illustrated in FIG. 3, the cooling roller 70 is disposed downstream of the press roller 60 in the rotation direction of the core 32 (the direction of arrow A). The cooling roller 70 cools the resin-covered cord 28, and also the core 32 through the resin-covered cord 28, while pressing the resin-covered cord 28 against the outer circumference of the core 32. Similarly to the press roller 60, the cooling roller 70 has an adjustable pressing force, and the roller surface thereof is treated to prevent adhesion of molten resin material thereto. Also similarly to the press roller 60, the cooling roller 70 is capable of rotating, and in a state in which the resin-covered cord 28 is being pressed against the outer circumference of the core 32, the cooling roller 70 rotates so as to follow the direction of rotation of the core 32 (the direction of arrow A). A liquid (such as water) flows through the inside of the cooling roller 70, and heat exchange with this liquid enables the resin-covered cord 28 contacted by the roller surface to be cooled. Note that the cooling roller 70 may be omitted in cases in which the molten resin material is allowed to cool naturally.

As illustrated in FIG. 3, when winding the resin-covered cord 28 onto the outer circumference of the core 32, the core 32 is attached to a tire support device (not illustrated in the drawings) and rotated in the direction of arrow A, and the resin-covered cord 28 is fed through the opening 46 of the cord feeder 40 toward the outer circumference of the core 32.

The hot air H is blown out through the blower outlet 52 of the heater 50 to heat the inner side face 26A of the resin 26 of the resin-covered cord 28 and melt the resin 26 as the inner side face 26A of the resin 26 of the resin-covered cord 28 is applied to the outer circumference of the core 32. When this is performed, the protrusions 30 melt first since the volume of the protrusions 30 as a proportion of the resin 26 is comparatively small, and the protrusions 30 have tapered cross-section profiles. The resin-covered cord 28 is then pressed against the outer circumference of the core 32 by the press roller 60. When this is performed, the side faces 26C, 26D of the resin 26 are bonded together at mutually adjacent portions of the resin-covered cord 28 in the tire axial direction (FIG. 6). Due to the parallelogram shaped cross-section of the resin 26, the adhesion surface area between the side faces 26C, 26D is larger than it would be in the case of a rectangular cross-section, thereby improving the bond strength. Moreover, since the side faces 26C, 26D are inclined with respect to the direction of the pressing force F, force acts in a direction normal to the side faces 26C, 26D, thereby improving the closeness of the contact between the side faces 26C, 26D.

The molten portion of the resin 26 of the resin-covered cord 28 is then contacted by the cooling roller 70 at the outer side face 26B of the resin 26, such that molten portion is cooled and solidified through the resin-covered cord 28. The mutually adjacent portions of the resin-covered cord 28 are thus welded together. The belt 20 can then be obtained by removing the resin-covered cord 28 from the core 32 once the resin 26 has solidified. As illustrated in FIG. 2, the protrusions 30 of the resin-covered cord 28 positioned at the tire axial direction end portions are not heated to the point of melting, and therefore remain intact.

Note that in order to wind the resin-covered cord 28 in a spiral shape, the position of the opening 46 of the cord feeder 40 may be moved in the tire axial direction accompanying rotation of the core 32, or the core 32 may be moved in the tire axial direction. Moreover, the reel 42 of the cord feeder 40 may be braked or a roller (not illustrated in the drawings) to adjust tension in the resin-covered cord 28 on a guide path may be provided in order to adjust the tension of the resin-covered cord 28. Adjusting the tension enables the resin-covered cord 28 to be suppressed from snaking as it is disposed.

Although not described in detail, the belt 20 may be employed in the manufacture of a tire 10 in which a vulcanization process is employed.

The bead core 11 illustrated in FIG. 9 can be manufactured by, for example, winding and bonding the resin-covered cord 28 in three tiers of three full circuits each.

Other Exemplary Embodiments

Although explanation has been given regarding an example of an exemplary embodiment of the present invention, exemplary embodiments of the present invention are not limited to the above, and obviously various other modifications may be implemented within a range not departing from the spirit of the present invention.

Although the belt 20 and the bead core 11 have been discussed as examples of tire structural members, tire structural members are not limited thereto, and other tire structural members (for example reinforcing layers) may be employed as long as the resin-covered cord 28 is wound in a spiral shape and the resin 26 is bonded together.

The disclosure of Japanese Patent Application No. 2017-236139, filed on Dec. 8, 2017, is incorporated in its entirety by reference herein.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A tire comprising an annular tire structural member in which a resin-covered cord, configured by covering a reinforcing cord with a resin including a protrusion formed on a side face, is wound in a spiral shape with the resin at one portion of the resin-covered cord integrally bonded to the resin at another mutually adjacent portion of the resin-covered cord, both of the resin at the one portion and the resin at the other portion being melt-solidified with the protrusion, wherein:
- the tire structural member is a belt that is pre-formed separately from a tire frame member, and that is disposed at an outer circumference of the tire frame member,
- as sectioned in a tire axial direction, the resin has a parallelogram shaped cross-section profile,
- the protrusion is formed continuously along a length direction of the resin-covered cord and is positioned substantially at the tire radial direction center of the side face of the resin-covered cord, and
- a shape of the protrusion at a bond location is lost after the resin at the one portion of the resin-covered cord has been bonded together with the resin at the mutually adjacent portion of the resin-covered cord.

* * * * *